Oct. 19, 1965 J. L. LONGWORTH 3,212,891

METHOD OF CORRECTING A HALF-TONE PRINT FOR REPRODUCTION

Filed Jan. 21, 1963

INVENTOR
James L. Longworth,
BY W. M. Kain
ATTORNEY

United States Patent Office 3,212,891

Patented Oct. 19, 1965

3,212,891

METHOD OF CORRECTING A HALF-TONE PRINT FOR REPRODUCTION

James L. Longworth, Winston-Salem, N.C., assignor to Western Electric Company, Incorporated, New York, N.Y., a corporation of New York Filed Jan. 21, 1963, Ser. No. 253,524
6 Claims. (Cl. 96—27)

Figures 1, 2:
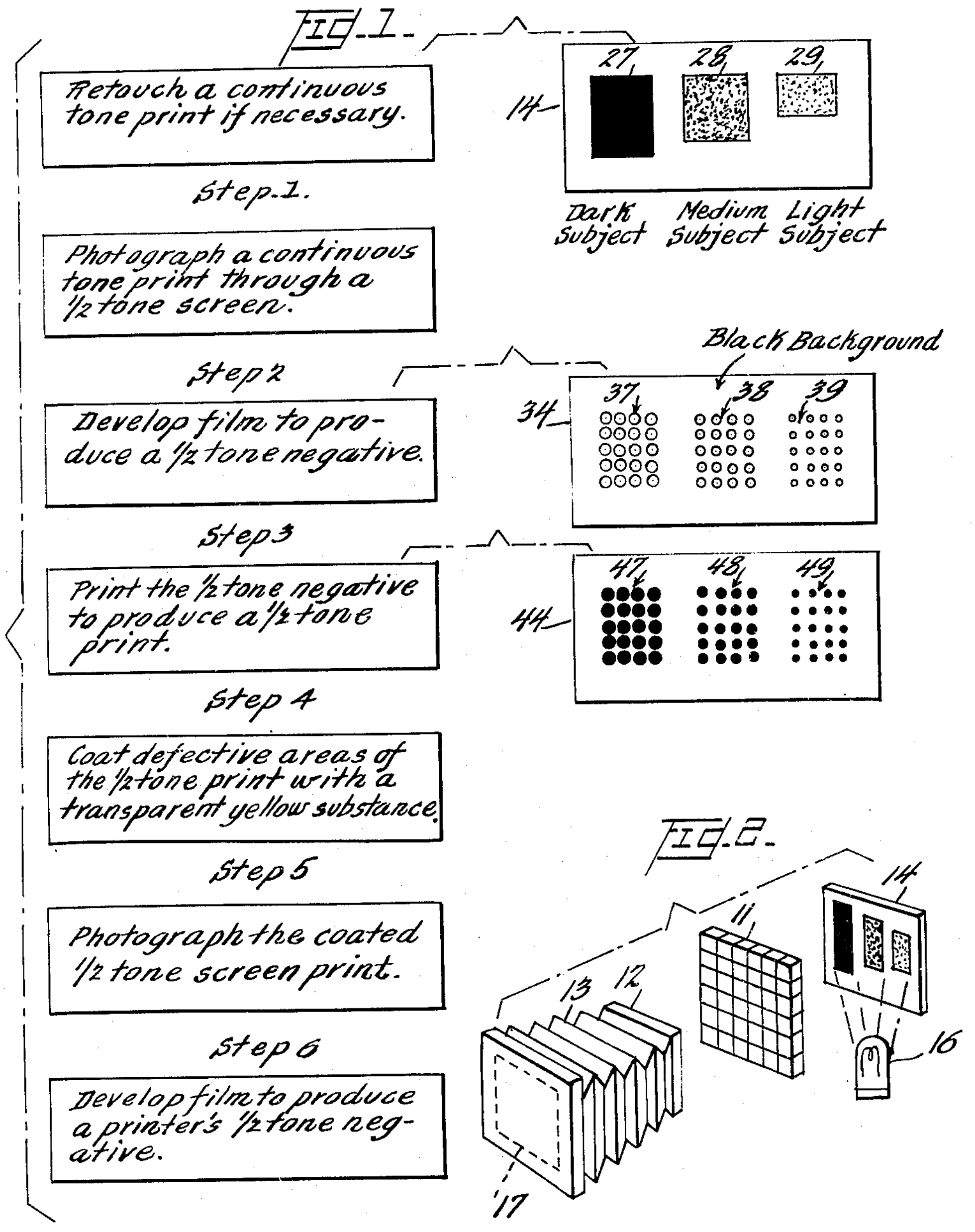

This invention relates to a method of correcting a half-tone print for reproduction and more particularly to a method of correcting a half-tone print having defects such as deficiencies in tone value, poor contrast, or weak or underdeveloped areas for reproduction.

In order to reproduce continuous-tone copy by offset lithography and other reproducting methods, it is necessary to convert the continuous-tone copy into a half-tone medium. In a half-tone print, the subject matter is represented by a series of small dots. These dots are evenly spaced, although not equal in size, and appear lighter or darker in tone depending upon the percentage of space covered by a dot as compared to the percentage of white paper surrounding the dot.

A prior art method of producing a half-tone print for reproduction includes the steps of retouching a continuous-tone copy, such as photograph, drawing, or the like; photographing the continuous-tone copy to produce a half-tone negative; and printing the half-tone negative to produce a half-tone print. If the resultant half-tone print has defects, such as deficiencies in tone value, poor contrast, or weak or underdeveloped areas, the print cannot be used in a reproduction process such as photolithography. Corrections must then be made on the original continuous-tone copy and the photographic steps repeated.

It may be necessary to photograph a half-tone print produced from a continuous-tone copy before use in a reproduction process; for example, it may be desired to identify certain portions of the subject matter with lead lines and other indicia. In conventional practice, these lead lines and indicia are placed on the half-tone print which is photographed to produce a printer's half-tone negative. This negative is used to produce a final half-tone print. The printer's half-tone negative may not be satisfactory in that light gray areas of the original half-tone print may be washed out and print as white areas in the final half-tone print. This necessitates making corrections on the original continuous-tone copy and repeating the photographic steps.

An object of this invention is to provide a new and improved method of correcting a half-tone print for reproduction.

Another object is to provide a method of correcting a half-tone print having defects, such as deficiencies of tone value, poor contrast, or weak or underdeveloped areas, for reproduction.

Another object is to provide a method of correcting a half-tone print for defects, such as deficiencies in tone value, poor contrast, or weak or underdeveloped areas, for use in producing a printer's half-tone negative.

A further object is to provide a method of preparing a half-tone print for reproduction wherein a portion of an acceptable half-tone print is intensified when the half-tone print is photographed to produce a printer's half-tone negative.

With these and other objects in mind, a half- tone print, having defects such as deficiencies in tone value, poor contrast, or weak or underdeveloped areas is coated or painted in the defective areas with a transparent, substantially pure yellow substance. The half-tone print is then photographed to produce a printer's negative free from these defects.

Other objects and advantages of the invention will become apparent by reference to the following detailed specification and accompanying drawings, wherein:

FIG. 1 is a block diagram showing a series of illustrative steps for making a printer's half-tone negative, including the steps comprising the method of the invention; and FIG. 2 is a perspective view of an arrangement of equipment which may be used in practicing the method.

In FIG. 2, there is shown an arrangement of conventional photographic equipment including a half-tone screen 11 interposed between a lens 12 of a camera 13 and a continuous-tone print 14. Light rays from a source of illumination 16 are directed toward the continuous-tone print 14. The half-tone screen 11 could also be placed within the body of the camera 13 between the lens 12 and a film 17. Any of a number of commercially available half-tone screens may be used. A suitable half-tone screen commonly used by photolithographers comprises two pieces of glass ruled with opaque lines equal in width to the space between the lines. The two pieces of glass are sealed together with the opaque lines at right angles to each other to form a grid.

Other than glass half-tone screens may be used, for example, a contact screen made of a flexible film base on which a dye image has been imposed. The contact screen is placed in direct contact with a sensitized film, either in the vacuum back of a process camera or in a vacuum printing frame. The method of the invention is not limited by the number of parallel screen rulings per inch on the half-tone screen. A magenta contact screen of the sort manufactured by the Eastman Kodak Company, Rochester, New York, has been used successfully in practicing the invention.

Referring to FIG. 1, there is shown in block outline form a series of illustrative steps of making a printer's half-tone negative which may be used generally in reproduction processes including, for example, the printing of publications, technical manuals, and the like. For purposes of illustration, the continuous-tone print 14 consists of three rectangles 27, 28, and 29 on a white background. Rectangle 27 represents dark subject matter; rectangle 28 represents medium-dark subject matter; and rectangle 39 represents light subject matter. The continuous-tone print 14 may preliminarily have to be retouched to correct defects; such as, spots, shadows, etc.

*Step 1.*—Photograph a continuous-tone print through a half-tone screen. The arrangement of conventional photographic equipment depicted in FIG. 2 may be used. A sheet of film 17 is mounted in a film holder (not shown) of camera 13. The film 17 may be any of a number of conventional black and white films. A photograph is taken of the continuous-tone print 14 through the half-tone screen 11. The screen 11 intercepts portions of the available light reflected from the continuous-tone print 14 and allows only a fine pattern of minute dots to appear on the film. The dots are evenly spaced, but vary in size and shape depending upon the amount of light reflected from the continuous-tone print 14 and transmitted by the half-tone screen 11.

*Step 2.*—Develop the film to produce a half-tone negative. The film is removed from the camera 13 and developed in a conventional manner. The development of the film produces a half-tone negative 34 which appears to have a continuous black background, but is really a series of evenly spaced, extremely minute, white dots surrounded by large black areas. For purposes of drafting convenience and illustration, the black background of the half-tone negative 34 is shown as white and is labeled "Black Background." A series 37 of large-size white dots represents the dark subject rectangle 27 of the continuous-tone print 14; a series 38 of medium-size white dots represents the medium-dark subject rectangle 28; and a series 39 of small-size white dots represents the light subject rectangle 29. It is to be noted that the size and arrangement of the dots are exaggerated for purposes of illustration.

*Step 3.*—Print the half-tone negative to produce a half-tone print. A contact print is made of the half-tone negative by means of a conventional exposure and developing process.

The resulting half-tone print 44 has what appears to be a continuous white background, but is really a series of minute black dots surrounded by large white areas. A series 47 of large-size black dots represents the dark subject rectangle 27 of the continuous-tone print 14, a series 48 of medium-size black dots represents the medium-dark subject rectangle 28; and a series 49 of large-size black dots represents the light subject rectangle 29.

Up to this point the above-described steps are similar to those of conventional prior art processes and illustrate a process in which the method of the invention may be used. The addition of the following steps enables one skilled in the art to correct a defective half-tone print without reverting back to the original continuous-tone copy to make corrections and then rephotographing. A defective half-tone print may have deficiencies in tone value, poor contrast, weak or underdeveloped areas, or the like. Also, if the half-tone print is acceptable and certain areas of the entire print are desired to be intensified, this can be accomplished by means of the following steps without reverting back to altering the original continuous-tone copy and rephotographing.

*Step 4.*—Coat the defective areas of the half-tone print with a transparent yellow substance. An effective way of accomplishing this step is to coat or paint the defective areas of the half-tone print 44 with a transparent, substantially pure yellow colored liquid. It is not essential that the substance be a liquid, but it is necessary that the substance applied to the defective areas be transparent and yellow. If the area to be coated is small, a sable brush may be used; if the area is large, an air brush may be used. Any means of applying the transparent yellow substance to the defective areas of the half-tone print 44 may be employed; however, the transparent yellow substance should be applied evenly so as to prevent any undesired intensification due to streaking. The transparent, yellow liquid may be water soluble in order to facilitate removal of the liquid from areas inadvertently coated.

It has been found experimentally that a transparent substance of almost any yellow color may be used in performing this step. However, the nearer to pure yellow the color is, the better are the results. For example, the following yellow colors, manufactured by Winsor and Newton Limited, London, England, identified in an undated brochure entitled "Artists' Water Colours," No. 50, published by Winsor and Newton, Limited, produce the indicated results: the colors designated AA Cadmium Yellow Series 3, AA Lemon Yellow Series 3, and others produce some improvements; the colors designated A Cadmium Yellow Series 3 and C Chrome Yellow Series 1 produce good results; and the colors designated A Cadmium Yellow Pale Series 3 and A Winsor Yellow Series 2 produce best results.

*Step 5.*—Photograph the coated half-tone screen print. The arrangement of equipment shown in FIG. 2 may be used; however, the half-tone screen 11 is not utilized. A second sheet of film 17 is mounted in the film holder of the camera 13. The film 17 may be any of a number of conventional black and white films. A photograph is taken of the painted half-tone print 44 to produce a film having an exposure of a fine pattern of minute dots thereon.

*Step 6.*—Develop the film to produce a printer's half-tone negative. The film is removed from the camera 13 and developed in a conventional manner. The development of the film produces a printer's half-tone negative having a series of white dots of varying sizes representing the subject matter of the continuous-tone print 14, and what appears to be a continuous black background, but is really a series of evenly spaced, extremely minute, white dots surrounded by large black areas.

This negative may be used to produce a single print or it may be used in a multiple reproduction process. For example, the printer's half-tone negative may be used to make a half-tone printing plate for a photolithographic process. In the latter process, the photosensitive surface of a printing plate is developed by means of a conventional developing process to produce on the surface of the printing plate a series of raised dots representing the subject matter of the continuous-tone print 14. The printing plate is mounted in an offset printing press. Ink is applied to the printing plate which transfers a half-tone image to a cylinder which, in turn, impresses the image upon the paper being run through the press.

The resulting printed half-tone reproduction is a series of evenly spaced inked dots, appearing lighter or darker in tone depending upon the percentage of space occupied by the inked dots as compared to the percentage of space occupied by the paper. The dots are inconspicuously minute in light areas and almost disappear; however, in heavy black areas, the inked dots are very large and appear to join together to form a solid surface.

This reproduced half-tone print does not suffer from any of the defects previously noted: deficiencies in tone value, poor contrast, weak or underdeveloped areas, or the like. Also, light gray areas of the half-tone print 44 are not washed out and printed as white areas when the half-tone print 44 is coated in these areas, photographed, and reprinted. These improvements result from coating the defective areas with the transparent, yellow substance. It is also noted that an area of an acceptable half-tone print can be intensified, if it be desired, using the method of the invention.

It is to be understood that the above-described method is illustrative of the principles of the invention and many other alternatives could be devised without departing from the scope of the invention.

What is claimed is:

1. In a method of correcting a black and white half-tone print having defective areas wherein the dots representing a half-tone value are weak and underdeveloped in tone value, the steps of:
   - coating only the defective areas of weak and underdeveloped dots of the half-tone print with a transparent yellow substance, and
   - photographing the coated half-tone print to produce a black and white negative in which the weak and underdeveloped dots are corrected in tone value.

2. A method of correcting the defective areas of a black and white half-tone print which have dots of insufficient intensity to present predetermined tone values, and producing a black and white half-tone printer's negative free from the defective areas, comprising the steps of:
   - applying a transparent yellow substance only on the defective areas of dots of insufficient intensity on the halftone print, and
   - photographing the half-tone print to produce a black and white half-tone printer's negative which has dots of increased intensity only in areas corresponding to the defective areas of the print to present the predetermined tone values.

3. A method of producing a final black and white half-tone print having a plurality of areas of dots of sufficient intensity to present different predetermined half-tone values, from an initial black and white half-tone print having defective areas with dots of insufficient intensity to present the different predetermined half-tone values, the steps of:
   - coating only the defective areas of dots of insufficient intensity on the initial half-tone print with a transparent yellow liquid, photographing on a black and white film the coated initial half-tone print, developing the film to produce a printer's half-tone negative, and printing the printer's half-tone negative to produce the final black and white half-tone print which has dots of sufficient intensity to present the different predetermined half-tone values.

4. In a method of intensifying the tone value of a selected area of dots on a black and white half-tone negative produced photographically from a black and white half-tone print, the steps of:

coating the black and white half-tone print with a transparent yellow substance only in the area of dots selected for intensification in tone value, photographing on a black and white film the coated half-tone print, and developing the film to produce a half-tone printer's negative having the intensified tone value presented by the dots in the selected area.

5. A method of processing a continuous-tone print to produce a final black and white half-tone print, comprising the steps of:

photographing the continuous-tone print through a half-tone screen to produce a black and white half-tone negative, printing the half-tone negative to produce an initial black and white half-tone print having areas of dots presenting different tone values, coating only selected areas of dots on the initial half-tone print with a transparent yellow liquid, photographing the coated initial half-tone print to produce a printer's black and white half-tone negative, and printing the printer's half-tone negative to produce a final black and white half-tone print having dots presenting increased tone values only in areas corresponding to the selectively coated areas on the initial print.

6. A method of processing a continuous-tone print to produce a final black and white half-tone print, comprising the steps of:

photographing on a first black and white film the continuous-tone print through a half-tone screen, developing the first film to produce a half-tone negative, printing the half-tone negative to produce an initial black and white half-tone print having areas of dots presenting different tone values, coating only selected areas of dots on the initial half-tone print with a transparent substantially pure yellow liquid, photographing on a second black and white film the coated initial half-tone print, developing the second film to produce a printer's half-tone negative, and printing the printer's half-tone negative to produce a final black and white half-tone print having dots presenting increased tone values only in areas corresponding to the selectively coated areas on the initial print.

References Cited by the Examiner

UNITED STATES PATENTS

| | | | |
|---|---|---|---|
| 114,968 | 5/71 | Rehn | 96—27 |
| 1,663,996 | 3/28 | Collet | 96—27 |
| 1,951,574 | 3/34 | Karl | 96—27 |
| 2,048,876 | 7/36 | Marx | 96—45 |
| 2,276,718 | 3/42 | Crosby | 96—45 |
| 2,391,025 | 12/45 | Marx | 96—45 |
| 2,754,427 | 7/56 | Berry | 95—101 X |

FOREIGN PATENTS

| | | |
|---|---|---|
| 1,064,809 | 9/59 | Germany. |

OTHER REFERENCES

Hackelman: Commercial Engraving & Printing, pages 78–80, copyright 1924, TR925H251924.

NORMAN G. TORCHIN, *Primary Examiner.*

SAMUEL FEINBERG, *Examiner.*